(12) United States Patent
Yovichin et al.

(10) Patent No.: US 7,344,614 B2
(45) Date of Patent: Mar. 18, 2008

(54) TIRE BREAKER STRIP APPLICATION METHOD AND TIRE FABRICATED THEREFROM

(75) Inventors: Albert James Yovichin, Doylestown, OH (US); Andres Ignacio Delgado, Medina, OH (US); Mary Beth Dombrosky, Cuyahoga Falls, OH (US); Mark Anthony Sieverding, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 233 days.

(21) Appl. No.: 10/978,508

(22) Filed: Nov. 1, 2004

(65) Prior Publication Data

US 2006/0090831 A1    May 4, 2006

(51) Int. Cl.
*B29D 30/16* (2006.01)
*B29D 30/38* (2006.01)

(52) U.S. Cl. ........................ 156/117; 156/130
(58) Field of Classification Search ............. 156/117, 156/130, 134, 397; 152/526
See application file for complete search history.

(56) References Cited

U.S. PATENT DOCUMENTS

| | | | |
|---|---|---|---|
| 1,454,058 A | 5/1923 | Lowe | |
| 1,665,831 A | 4/1928 | Williams | |
| 1,894,237 A | 1/1933 | Mallory | |
| 3,550,667 A | 12/1970 | Bartley et al. | 152/361 |
| 3,674,079 A | 7/1972 | Varner | 152/361 |
| 3,844,871 A | 10/1974 | Habert et al. | 156/362 |
| 3,888,720 A | 6/1975 | Habert | 156/414 |
| 3,993,530 A | 11/1976 | Henley et al. | 156/405 |
| 4,239,565 A | 12/1980 | Henley et al. | 156/126 |
| 4,409,872 A | 10/1983 | Bertoldo | 83/155 |
| 4,933,033 A | 6/1990 | Bailey | 156/111 |
| 4,961,813 A | 10/1990 | Bailey | 156/406.4 |
| 5,117,887 A | 6/1992 | Lukosch et al. | 153/538 |
| 5,213,642 A | 5/1993 | Sponagel | 152/455 |
| 5,411,626 A | 5/1995 | Coretta et al. | 156/396 |
| 5,582,664 A | 12/1996 | Sergel et al. | 156/64 |
| 6,355,126 B1 * | 3/2002 | Ogawa | 156/117 |
| 6,769,468 B2 | 8/2004 | Currie et al. | 156/398 |
| 2002/0062908 A1 | 5/2002 | Mancini et al. | 156/130 |
| 2003/0051794 A1 | 3/2003 | Suda et al. | 156/123 |
| 2004/0011454 A1 | 1/2004 | Mancini | 156/130 |
| 2006/0137803 A1* | 6/2006 | Suda | 156/117 |

FOREIGN PATENT DOCUMENTS

| | | |
|---|---|---|
| EP | 0 492 918 A2 | 7/1992 |
| EP | 1 145 835 A2 | 10/2001 |
| EP | 1 211 058 A1 | 6/2002 |
| EP | 1 350 616 A1 | 8/2003 |
| JP | 2004174765 | 6/2004 |
| JP | 2004202804 | 7/2004 |
| WO | WO 00/38906 | 7/2000 |
| WO | WO-2004/030899 A1 * | 4/2004 |
| WO | WO2004065110 | 8/2004 |

\* cited by examiner

*Primary Examiner*—Geoffrey L. Knable
(74) *Attorney, Agent, or Firm*—Richard B. O'Planick

(57) ABSTRACT

A method for applying a breaker or other reinforcement layer to a carcass strip by strip includes the steps of calculating an end gap based upon a nominal strip width, the size of the carcass, and the end count desired; calculating a distributed gap required to distribute the calculated end gap substantially equally between each strip; and applying the breaker strip by strip with each strip being separated from an adjacent strip by the distributed gap spacing.

11 Claims, 5 Drawing Sheets

TIRE BREAKER STRIP APPLICATION METHOD AND TIRE FABRICATED THEREFROM

FIELD OF THE INVENTION

The invention relates generally to a tire breaker structural component manufacturing method and, more specifically, to a breaker strip manufacturing method and apparatus in a flexible tire manufacturing system.

BACKGROUND OF THE INVENTION

A vehicle tire typically comprises a radial carcass, tread, and tread reinforcing breaker or belt disposed between the carcass and tread. The breaker component pursuant to conventional techniques is constructed across the tread region as either a single sheet component applied unitarily or a series of overlapping strips extending in the peripheral direction of the tire. The width of the overlap between adjacent strips may be selected across the width of the tire to alter the characteristics of the breaker or to adjust the overlapping breaker strips so that the cumulative width of the strips covers the width of the target breaker region beneath the tread. Variations in the width of the tire may require strips of differing widths or the overlapping of such strips to a greater or lesser extent. U.S. Pat. No. 5,213,642 is representative of such an approach.

While working well and finding commercial application, the technique of constructing a breaker onto a carcass by the overlapping application of breaker strips one at a time carries significant disadvantages. The overlapping portions of adjacent breaker strips represents increased and often unnecessary material waste, adding to the cost of manufacture. Moreover, it is preferable that the breaker layer comprise a single layer applied as non-overlapped strips in order to enhance uniformity and the consistency of tire construction across the tire radial width. However, merely applying strips such as those proposed in U.S. Pat. No. 5,213,642 edge to edge across the tread region rather than an overlapping construct causes a new set of difficulties and can result in material waste as well. For example, a typical passenger tire may require 20 to 60 strips. Applying the strips at an angle in an edge to edge, zero clearance, configuration would require cutting a $21^{st}$ or $61^{st}$ strip to fill a final gap. Destruction of a breaker strip in order to fill a remainder gap on each tire results in an unacceptable level of scrap and high resultant cost of manufacture.

Alternatively, strips of a precise and prescribed width could be utilized to exactly cover the target region in an edge to edge non-overlapping layer in order to leave no remainder gap. While theoretically possible, such an approach would necessitate expensive production and inventorying of strips of varying widths in order to accommodate tires of varying sizes. Not only would the cost of inventory and production equipment escalate, but the change-over time required to transition strips of one width out and strips of a second width in for tires of varying sizes would undesirably complicate the manufacturing process and add cost to the each tire.

Accordingly, there remains a need for a manufacturing process and breaker construction that would accomplish the construction of a breaker onto a tire carcass in a non-overlapped configuration on a carcass one strip at a time. Such a process should eliminate or reduce to an acceptable level the remainder gap at the conclusion of the breaker formation. Additionally, the procedure and method should reduce equipment cost and equipment footprint, thus reducing floor space costs and manpower. The process should reduce change over time from one setup to another and allow belts to be produced for tires of varying sizes without necessitating individual component rolls of strips of varying width, angle, and gage.

SUMMARY OF THE INVENTION

The subject invention comprises a breaker strip application method and tire construction for applying strips of breaker onto a tire carcass one strip at a time. Each strip is applied to the outside of the carcass at a predesignated angle to the axial centerline of the tire. An applicator head may translate to produce the desired path or the carcass may be rotated as the applicator attaches each strip, or a combination of the two may be employed. In order to reduce the gap encountered at the end of the procedure to an acceptable width, pursuant to an aspect of the invention the end gap is precalculated based upon the nominal width of the strips and the size of the carcass (tire) onto which the strips are to be positioned. The end gap is distributed between each strip in the process of applying the strips to the carcass, whereby imparting a uniform strip pattern around the tire with a uniform distributed gap between adjacent strips. Pursuant to another aspect of the invention, strips of a common size may be employed in the construction of tires of differing sizes by calculating the respective end gap expected for each tire size based upon the width of the strips; calculating a distributed gap width required to distribute the end gap evenly between each strip in the process of applying the strips to the carcass; and applying the strips to the carcass at a separation spacing substantially equivalent to the calculated distributed gap value. The end gap is eliminated and distributed evenly to a series of distributed gaps of an acceptable width.

DEFINITIONS

The following terms may be used throughout the descriptions presented herein and should generally be given the following meaning unless contradicted or elaborated upon by other descriptions set forth herein.

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member typically attached to or wrapped by ply cords and shaped, with or without other reinforcement elements such as flippers, chippers, apexes, toe guards and chafers, to fit the design rim.

"Belt structure", "Breaker structure", or "Reinforcing Belts" means at least two annular layers or plies of parallel cords, woven or unwoven, underlying the tread, unanchored to the bead, and having both left and right cord angles with respect to the equitorial plane of the tire.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Design rim" means a rim having a specified configuration and width. For the purposes of this Specification, the design rim and design rim widths are as specified by the industry standards in effect in the location in which the tire is made. For example, in the United States, the design rims are as specified by the Tire and Rim Association. In Europe, the rims are as specified in the European Tyre and Rim Technical Organisation—Standards Manual and the term design rim means the same as the standard measurement rims. In Japan, the standard organization is The Japan Automobile Tire Manufacturer's Association.

"Design rim width" means the specified distance axially between rim flanges. For the purpose of this specification, the design rim width (D) is taken as (the minimum recommended rim width plus the maximum recommended rim width)/2 as specified by the appropriate industry standards.

"Equitorial plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Ply" means a continuous layer of rubber-coated parallel cords.

"Radial" and "radially" means directions radially toward or away from the axis of rotation of the tire.

"Radial-ply tire" means a belted or circumferentially restricted pneumatic tire in which the ply cords which extend from bead to bead are laid at cord angles between 65° and 90° with respect to the equitorial plane of the tire.

"Section height" (SH) means the radial distance from the nominal rim diameter to the outer diameter of the tire at its equitorial plane.

"Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of a sidewall just below the tread edge.

"Sidewall" means that portion of a tire between the tread and the bead.

"Tread width" means the arc length of the tread surface in the axial direction, that is, in a plane passing through the axis of rotation of the tire.

BRIEF DESCRIPTION OF THE DRAWINGS

The invention will be described by way of example and with reference to the accompanying drawings in which.

DETAILED DESCRIPTION OF THE INVENTION

Figure 6:
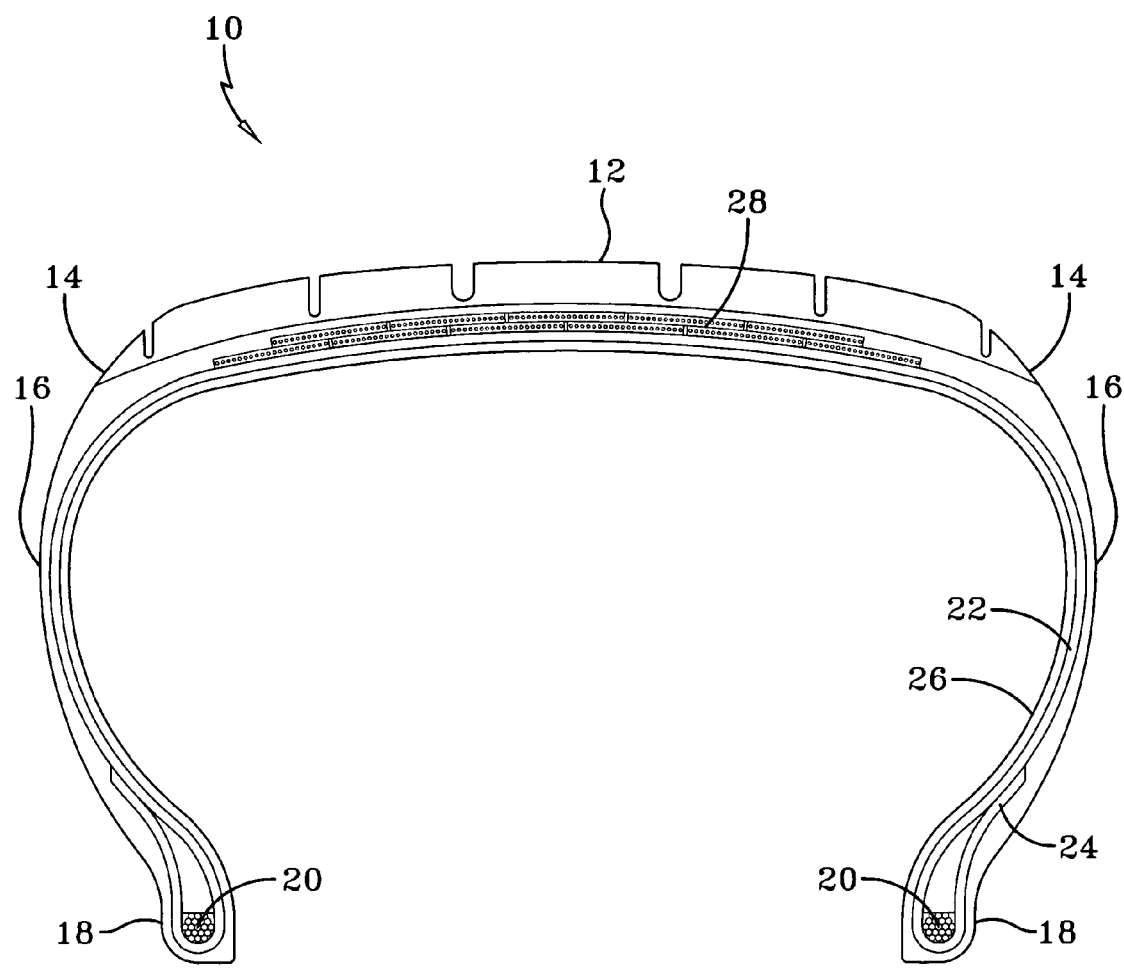
FIG. 6 is a cross sectional view through a finished tire showing evenly distributed gaps between breaker strips around the tire.

Although the invention is not limited to any particular type of tires, an exemplary radial-ply tire 10 is shown in FIG. 6 for illustration. Referring to FIG. 6, there is illustrated a cross sectional view of a cured, unmounted tire 10 made in accordance with the present invention. The tire 10 is provided with a ground-engaging tread portion 12, which terminates in the shoulder portions 14 at the lateral edges of the tread. Axially outer sidewall portions 16 extend from shoulder portions 12 and terminate in the bead portion 18, the bead portion having an annular inextensible tensile member or bead core 20. The tire 10 is further provided with a carcass reinforcing structure 16 which extends from the tensile members 20 through the sidewall portions 16, the tread portions 14. The turnup ends 24 of the carcass reinforcing structure 22 are wrapped about the tensile members 20. As illustrated, the bead portion 18 has a toeguard wrapped about the carcass reinforcing structure 22 and the tensile member 20. The tire 10 may include a conventional innerliner 26 forming the inner peripheral surface of the tire 10 if the tire is to be of the tubeless type.

Figure 5:
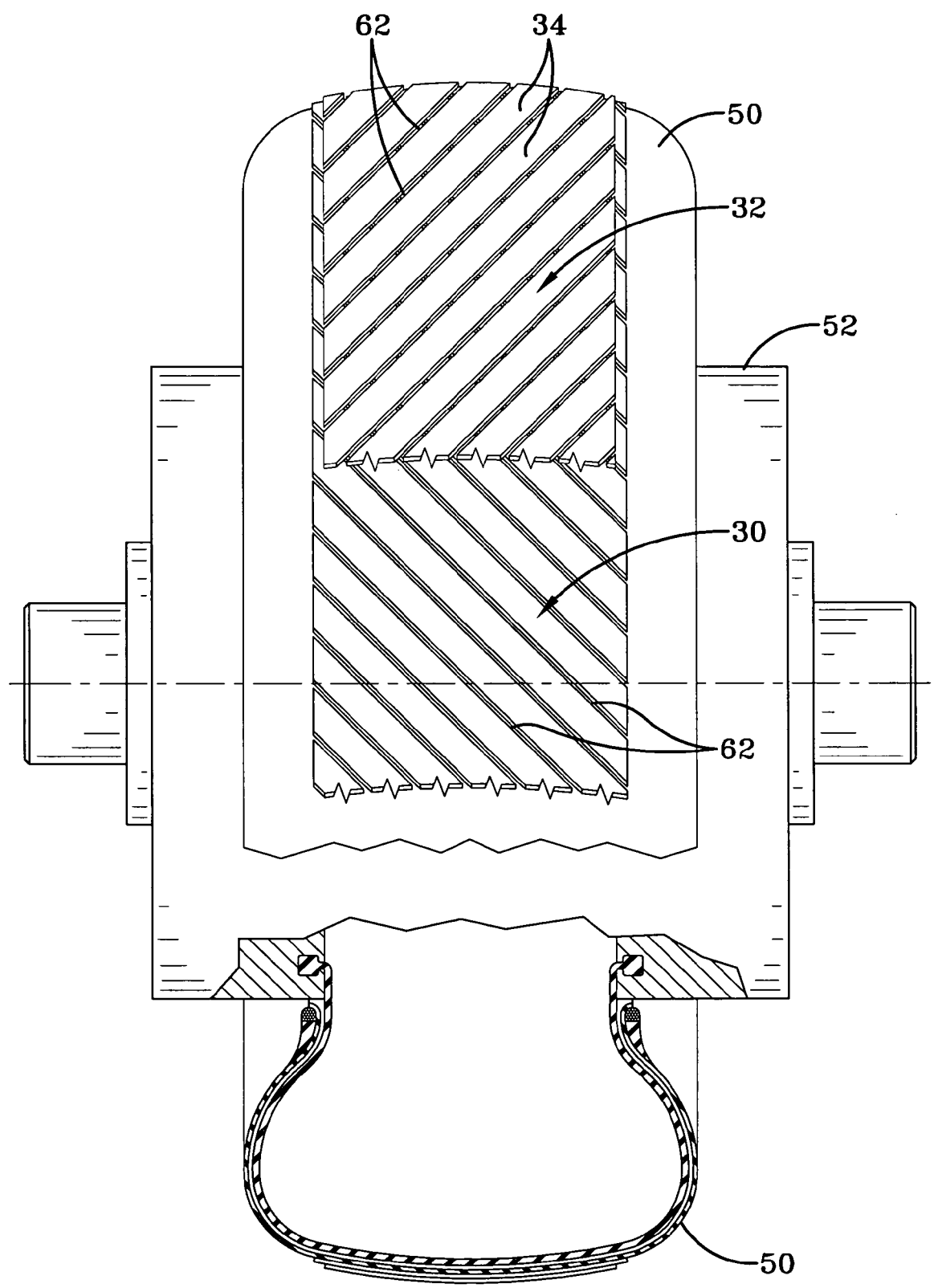
FIG. 5 is a side elevation view of a tire carcass shown partially in section and illustrating overlapping breaker packages applied to an outer carcass surface.

Placed circumferentially about the radially outer surface of the carcass reinforcing structure 22, beneath the tread portion 12, is a breaker layer or structure 28. For example, the breaker structure 28 may comprise first and second breaker plies 30,32 as represented in FIG. 5, each formed as single cut belt plies and the cords of the belt plies are oriented at an angle ranging between 20° and 60° with respect to the equitorial plane of the tire. The cords of neighboring plies 30,32 are disposed in opposite directions with respect to the equitorial plane (EP) of the tire. However, the breaker structure 28 may comprise any number of belt plies of any desired configuration and the cords may be disposed at any desired angle.

Figure 1:
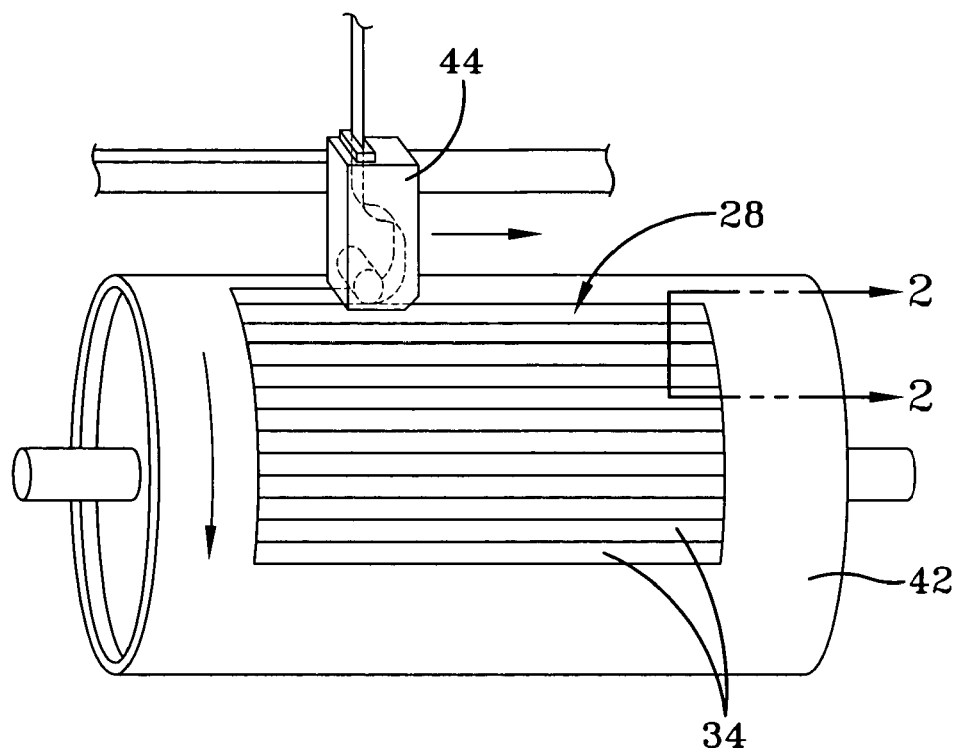
FIG. 1 is a perspective view of a prior art tire carcass onto which a series of overlapping breaker strips are applied by an applicator head.
Figure 2:
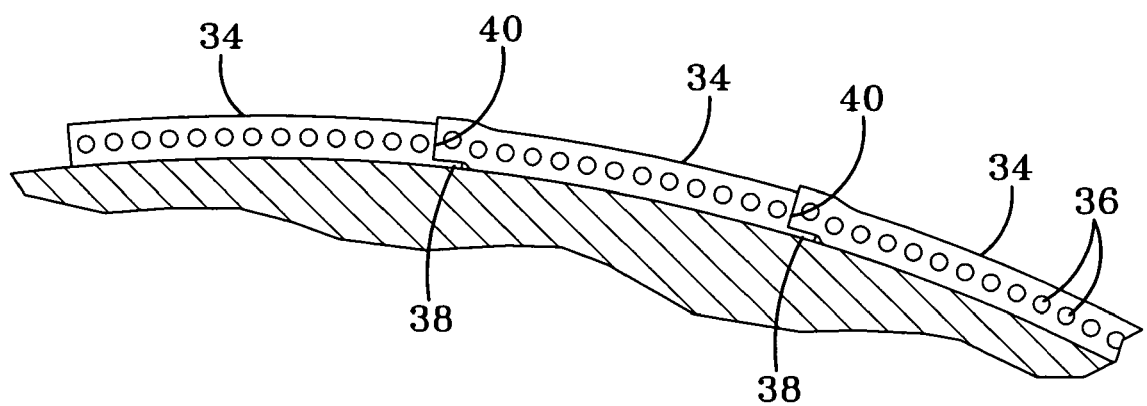
FIG. 2 is a sectional view through the carcass taken along the line 2-2 of FIG. 1.

With reference to FIGS. 1 and 2, illustrated is a prior art method of constructing a reinforcement breaker structure from a plurality of strips 34. Each strip is formed having reinforcement cords 36 extending longitudinally and each strip is constructed to provide a stepped overlap joint 38 along opposite edges 40. The strips 34 are dispensed onto a rotating drum 42 by means of an applicator head 44 that moves reciprocally across the outer drum surface as the drum rotates in a synchronous manner. As each strip is applied to the drum, it is positioned by head 44 edge to edge with an adjacent strip, the strip joints 38 overlapping to form the entirety of the breaker structure 28. The angle of the breaker structure 28 relative to the rotating drum 42 may be varied to design specifications pursuant to conventional practice.

While the apparatus and method incorporated into FIGS. 1 and 2, representative of the prior art, is functionally adequate, it will be readily appreciated that the width of the strips 34 laid edge to edge will result in an end gap at the end of the breaker construction. To fill the end gap, a final strip 34 would need to be sized and cut, leaving the remainder of the strip as scrap. The cost of such scrap on a per tire basis is unacceptable. Alternatively, the width of each strip 34 could be sized to cover the drum 42 in an even number. However, a strip so sized could not be utilized in the production of breaker packages for tires of other sizes without encountering the same end gap problem. Inventorying strips of specific width for each tire size adds cost of manufacture and requires a substitution of breaker strips of varying widths for tires of differing sizes. Inflexibility in the manufacturing system results and ensuing delays due to breaker strip changeover further add unacceptable cost.

Figure 4:
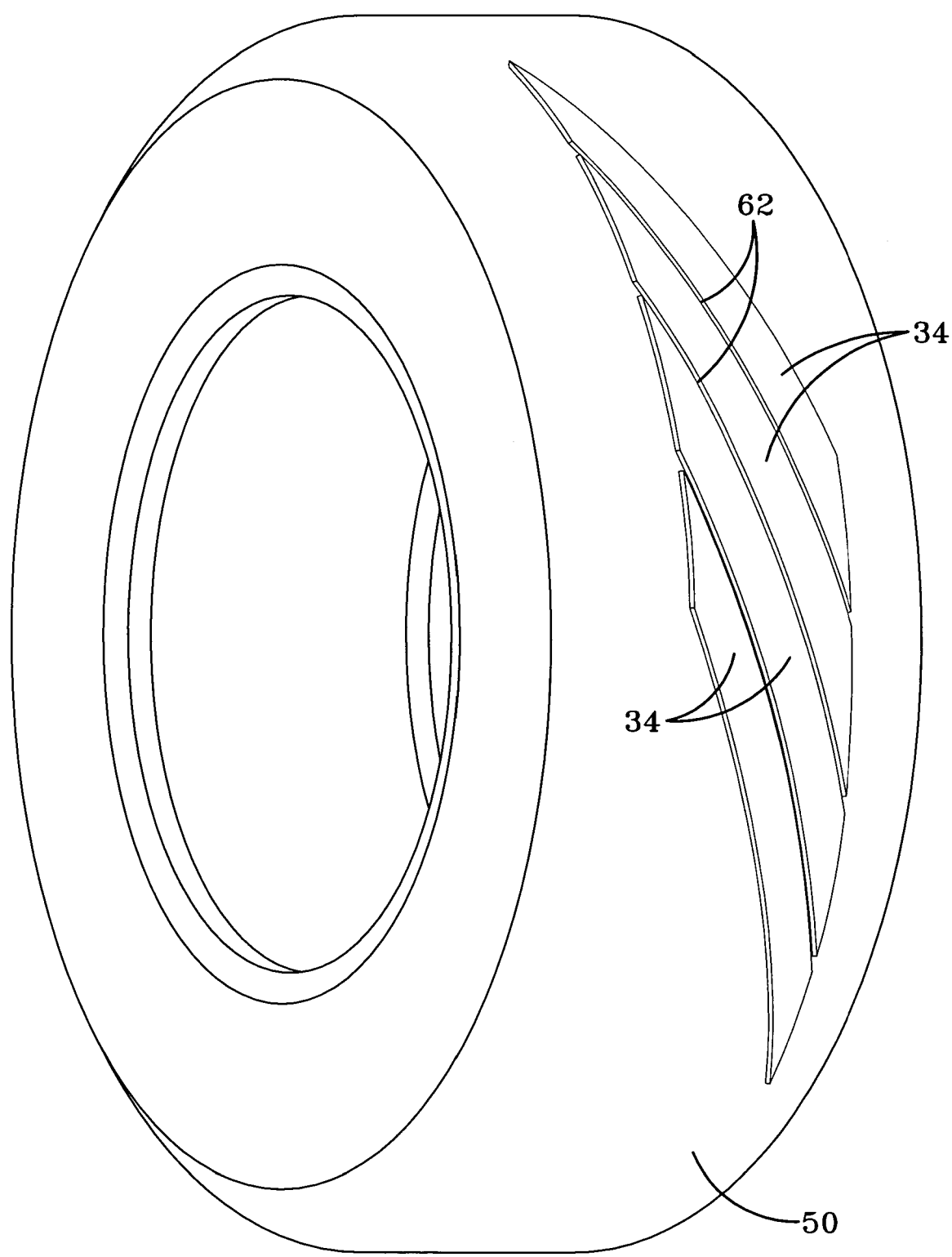
FIG. 4 is a perspective view of a tire having a representative pattern of breaker strips applied pursuant to the invention.

The reinforcement breaker structure 28, pursuant to the invention, is constructed from a plurality of strips 34 composed of reinforcement cords formed from any known materials known in the art for breaker reinforcement cords. Such materials include but are not limited to steel, aramid, or nylon. The strips 34 as best seen in FIGS. 4 and 5 are intended to be of a generally standardized width suitable for layering a breaker structure to tires of varying sizes. The strips are laid side by side to form a layer of spaced strips. Each strip 34 may, but not necessarily, be configured to provide a plurality of cords 36 extending longitudinally and the strips 34 may be configured in a layer that may be, although not necessarily, angled to the equitorial plane of the tire as shown in FIG. 4. The strips may be assembled to a drum as shown in FIG. 1 or be assembled directly to a carcass layer during tire formation.

Figure 3:
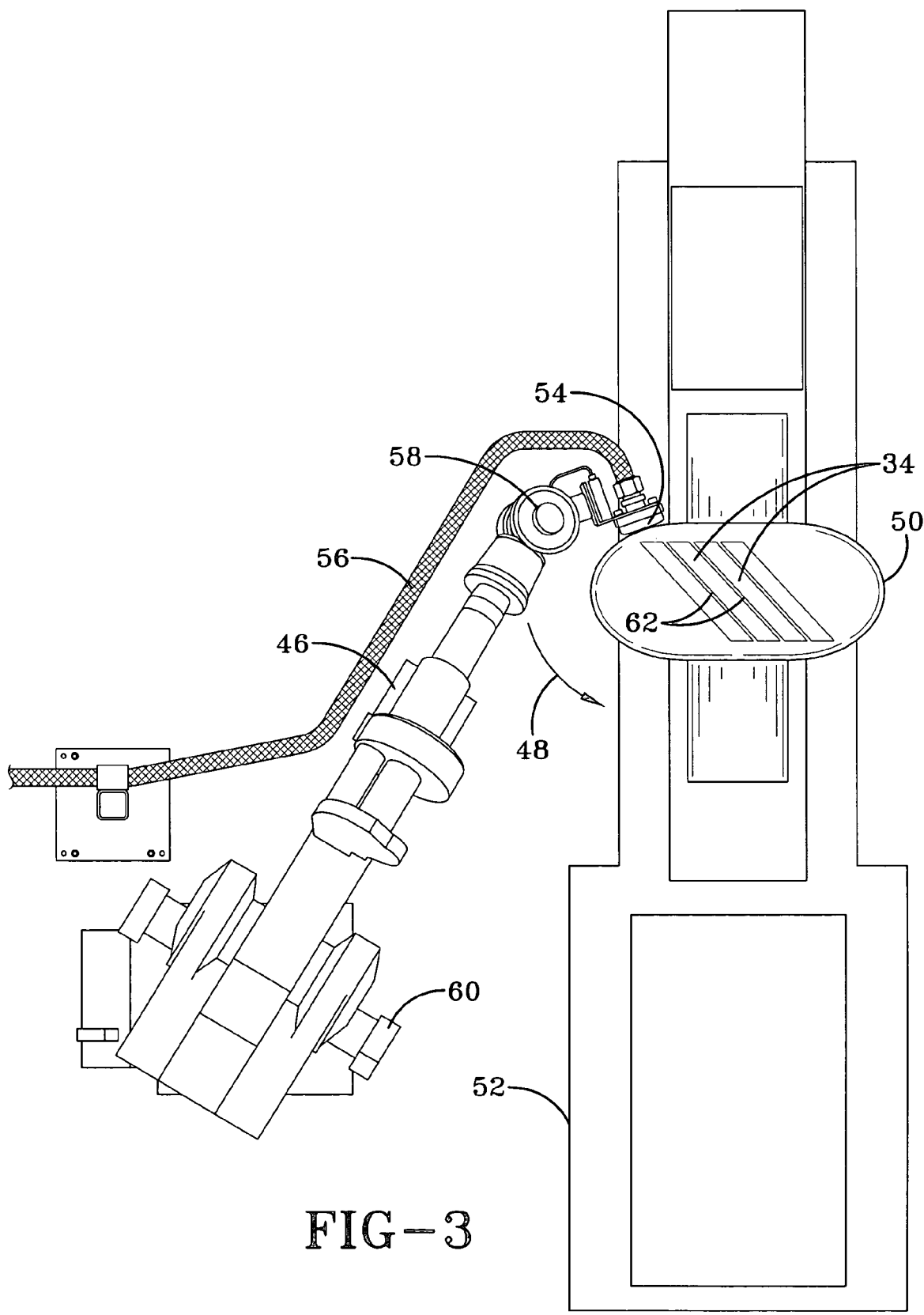
FIG. 3 is a perspective view of an applicator head for distributing a series of breaker strips to a tire carcass.

FIG. 3 illustrates a breaker reinforcement apparatus including an applicator arm 46 that moves pivotally as indicated by arrow 48 relative to a rotating tire carcass 50. The apparatus depicted in FIGS. 3 and 5 is intended to be schematic and representative of but one method of laying on a breaker reinforcement constructed pursuant to the invention. Other means for laying on such a breaker construction are intended to be within the scope of the invention. The carcass 50 receives the breaker reinforcement directly in the method shown in FIGS. 3 and 5. It will be apparent to those skilled in the art that the breaker package may be affixed to a drum if desired and subsequently applied to a carcass if preferred.

The apparatus arm 48 further includes a head 54 that is supplied with breaker reinforcement material. The breaker material is applied or fed and cut from head 54 onto rotating carcass in a programmed manner so as to lay down strips 34 as shown. The arm 48 includes a pivot joint 60 at the base end and a pivot joint 58 proximate the head 54 to facilitate movement of the head 54 across carcass 50. As shown, strips 34 are applied at a prescribed angle relative to the equitorial plane of tire carcass 50 as is known in the art. The apparatus 52 serves to support and rotate tire carcass 50 synchronously with the application of strips 34 in a semi-liquid form by means of the apparatus head 54.

Referring to FIGS. 4 and 5, the subject invention permits the use of strips 34 of standardized width for the creation of a tire breaker for tires of varying sizes. The strip of breaker is applied onto the tire carcass, one narrow strip at a time at a predesignated angle. The applicator head may translate to produce the desired path or the drum rotated and the applicator head attaches the strip, or a combination of the two may be employed. For each tire size, a pre-application calculation of a residual end gap is made based upon the breaker strip width and the circumferential area to be covered. The residual end gap encountered by the last strip is then reduced to a distributed gap width 62 as shown in FIGS. 4 and 5. The distributed gap width 62 is the gap distributed between each strip 34 so that the breaker coverage is uniform and of a uniform pattern around the tire. The distributed gap 62 is preferably substantially uniform between each strip 34 but the gap 62 may vary slightly between each strip so long as the distributed gap width is not large enough to compromise the performance of the breaker to an unacceptable degree.

When a tire of a different size it to be produced, the same strips may be employed, saving changeover time. The end gap is recalculated for the new tire size and the distributed gap width based upon the calculated end gap is determined. The distributed gap width may differ from tire size to tire size a nominal amount without detrimentally affecting breaker performance to an unacceptable level. Applying the breaker as a strip rather than a sheet onto the tire carcass, gives much flexibility in tires of different sizes, belt angles, etc. Change over time from one setup to another is reduced and allows belts to be produced to order versus requiring individual component rolls for each width, angle, tire size, and gage. As a result, equipment costs are reduced and equipment footprints smaller, thus reducing floor space costs and reducing manpower that otherwise be required to man a separate component making station.

Breaker strips could be produced at the tire building equipment (or fabricated remotely if desired). Preferably, each strip would have a predesigned ends-per-inch (EPI). Tires of differing sizes would require more or less strips to encompass the whole tire. For example, a typical passenger tire may require 20 to 60 strips. If 20.6 strips or 60.3 strips would be necessary to cover the entire tire, an applier would be required to reduce the width of the last strip to completely encompass the outside of the carcass and have zero clearance between strips. This would mean cutting a $21^{st}$ or a $61^{st}$ strip to fill the final gap. The result would produce an unacceptable level of scrap and be cost prohibitive. In using the subject invention, the end gap that the last partial strip would fill is distributed between each strip. The maximum distributed gap is less than one end count preferably, well within acceptable limits. With the subject invention, therefore, for the 20.6 strips case, only 20 strips would be used and the 0.6 inch strip would be distributed between the 20 strips, giving a 0.03 inch gap between strips which, for a 24 EPI code, is equivalent to a 0.72 cord gap. For the 60.3 strips example, one would distribute the 0.3 inch strip among the 60 strips, resulting in a 0.005 inch gap between strips which, for a 24 EPI code, is equivalent to a 0.01 cord gap. For lower end counts, the distributed gap would be even less.

The method applying a breaker or other reinforcement layer to a carcass strip by strip, therefore, comprises the steps of calculating an end gap based upon a nominal strip width, the size of the carcass, and the end count desired; calculating a distributed gap required to distribute the calculated end gap substantially equally between each strip; and applying the breaker strip by strip with each strip being separated from an adjacent strip by the distributed gap spacing. A tire formed by the process described thus would be fabricated in a cost effective and efficient manner without compromising the acceptable performance criteria of the breaker ply.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method for constructing a tire breaker reinforcement layer strip by strip comprising the steps:

a. calculating a circumferential end gap resulting from an abutting side to side attachment of breaker strips about the circumference of a carcass, the calculation being based upon a nominal strip width, the circumferential size of the breaker layer on the carcass, and the end count desired, and wherein the end gap is less than a width of a breaker strip;

b. calculating a distributed gap spacing required to distribute the calculated end gap substantially equally between each strip, wherein individual gaps between the strips aggregate to the calculated end gap; and c. constructing the breaker strip by strip with each strip being separated from an adjacent strip by the distributed gap spacing.

2. A method according to claim 1, wherein the strips are applied to a tire carcass.

3. A method according to claim 2, wherein the strips are applied at an angle with respect to an equatorial plane of the tire carcass.

4. A method according to claim 1, wherein the strips are applied to a drum.

5. A method according to claim 4, wherein the strips are applied at an angle with respect to an equatorial plane of the drum.

6. A method according to claim 1, further comprising the step of utilizing the strips in the construction of a tire breaker of a different sized tire by:

d. re-calculating an end gap based upon a nominal strip width, the circumferential size of the tire breaker, and the end count desired for the different sized tire, wherein the recalculated end gap is less than a width of a breaker strip;

e. re-calculating a distributed gap required to distribute the calculated end gap substantially equally between each strip for the different sized tire, wherein individual gaps between the strips aggregate to the re-calculated end gap; and f. attaching the breaker strip by strip with each strip being separated from an adjacent strip by the re-calculated distributed gap spacing.

7. A method for constructing a tire breaker reinforcement layer strip by strip comprising the steps:

a. calculating a circumferential end gap resulting from an abutting side to side attachment of breaker strips about the circumference of a carcass wherein the end gap is less than a width of a breaker strip, each breaker strip having at least one cord member and each breaker strip having a transverse width greater than the width of the one cord member, the calculation being based upon a nominal strip width, the circumferential size of the breaker layer on the carcass, and the end count desired;

b. calculating a distributed gap spacing required to distribute the calculated end gap substantially equally between each strip wherein individual gaps between the strips aggregate to the calculated end gap; and c. constructing the breaker strip by strip with each strip being separated from an adjacent strip by the distributed gap spacing.

8. A method according to claim 7, wherein the strips are applied to a tire carcass.

9. A method according to claim 8, wherein the strips are applied at an angle with respect to an equatorial plane of the tire carcass.

10. A method according to claim 7, wherein the strips are applied to a drum.

11. A method according to claim 10, wherein the strips are applied at an angle with respect to an equatorial plane of the drum.

* * * * *